United States Patent [19]

Sanserino

[11] Patent Number: 5,748,707
[45] Date of Patent: May 5, 1998

[54] SPEAKERPHONE WITH REMOTE MICROPHONE HAVING SPEAKER CUT-OFF FOR HALF-DUPLEX OPERATION

[76] Inventor: Jon J Sanserino, 11559 Morrison St., North Hollywood, Calif. 91601

[21] Appl. No.: 320,183

[22] Filed: Oct. 7, 1994

[51] Int. Cl.⁶ .................................................. H04Q 7/00
[52] U.S. Cl. ................................................ 379/61; 379/62
[58] Field of Search ................................... 379/62, 61

[56] References Cited

U.S. PATENT DOCUMENTS 5,297,203   3/1994   Rose et al. ............................. 379/62

OTHER PUBLICATIONS

Lifestyles, "At Last, a Pocket Cordless Phone That is Truly Portable", p. 3, Jun. 1993.

*Primary Examiner*—William Cumming
*Attorney, Agent, or Firm*—Allan M. Shapiro

[57] ABSTRACT

The remote wireless speakerphone system comprises a base receiver for direct connection to telephone company lines to receive and transmit voice information over the lines. The base receiver has a speaker which has sufficient power to make voice information received on the telephone line audible in a room. The system also includes a transmitter unit sized to be carried on the person of the user. The transmitter unit includes a microphone positioned to take up the speaking voice of the user and a radiotransmitter which transmits this signal to the receiver. The receiver delivers this voice information to the telephone company line. In this way, the user is free of wires connecting him to the base unit and can conduct two-way conversation by listening to the speaker on the base unit and speaking into the microphone he carries.

8 Claims, 7 Drawing Sheets

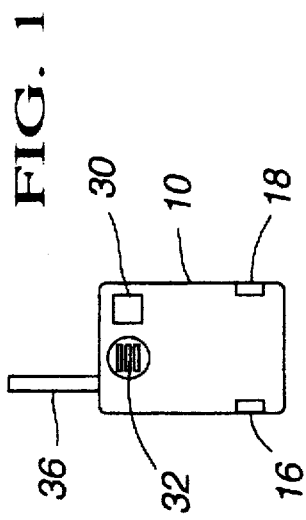
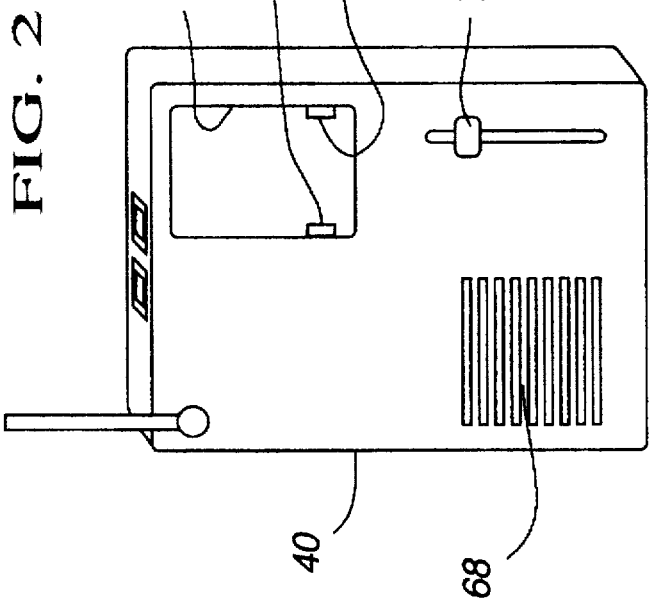
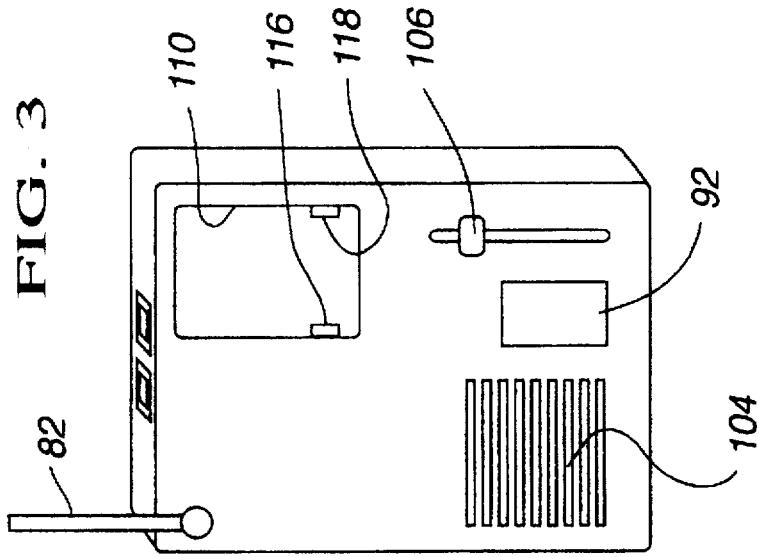

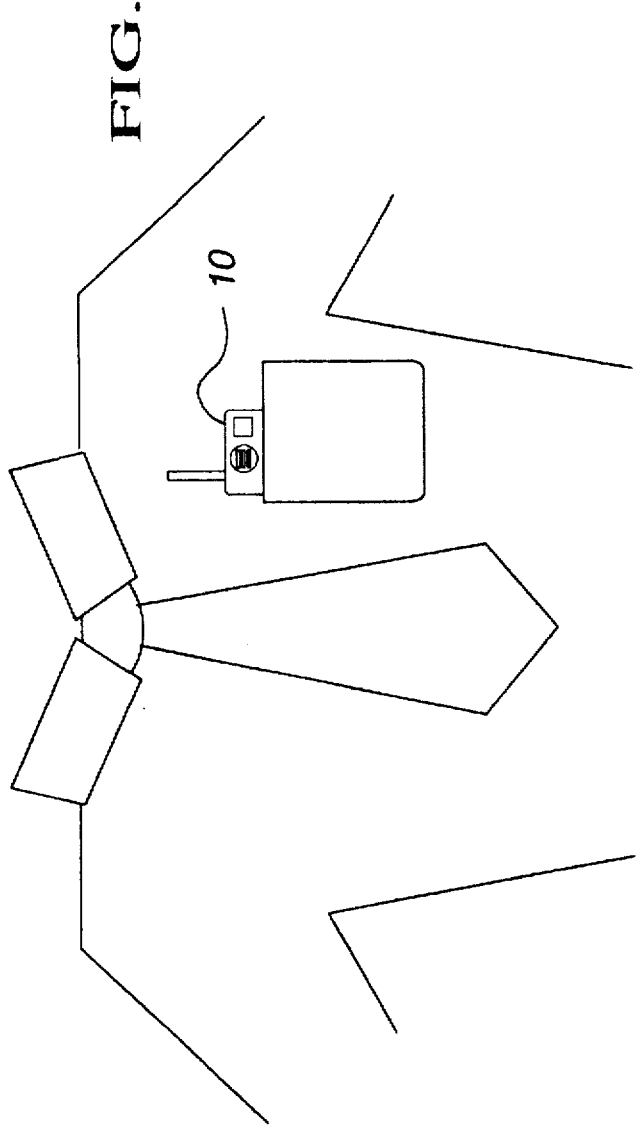

SPEAKERPHONE WITH REMOTE MICROPHONE HAVING SPEAKER CUT-OFF FOR HALF-DUPLEX OPERATION

FIELD OF THE INVENTION

This invention is directed to a speakerphone system where the base station containing the speaker is directly connected to the telephone line and the microphone is carried by the user for freedom of movement of the user as long as he is within hearing range of the base station.

BACKGROUND OF THE INVENTION

Present-day speakerphones are placed on a desk or table in an office. The speakerphone contains both a microphone and a loudspeaker. It is useful and productive to be free to move about the room and work while talking on the phone. However, the room echo is picked up on the speakerphone microphone. This sound is often referred to as "speakerphone sound" or "barrel sound." Because of this, many people hesitate to use their speakerphone since they may be asked to turn it off and pick up the receiver to avoid the hollow sound on the other end of the conversation. Thus, there is need for a convenient and versatile speakerphone system which does not have the hollow sound or present speakerphones.

SUMMARY OF THE INVENTION

In order to aid in the understanding of this invention, it can be stated in essentially summary form that it is directed to a remote wireless speakerphone which includes a base station which is directly connected to the telephone company system wires and which has a speaker thereon. The system includes a remote transmitter carried by the user. The transmitter includes a microphone so that the microphone is always close to the user to avoid the hollow sound. Two-way conversations can be carried on as long as the user is within hearing distance of the loudspeaker.

It is thus an object and advantage of this invention to provide a remote wireless speakerphone which is configured with the microphone carried by the user to avoid the hollow sound of conventional speakerphones.

It is another object and advantage of this invention to provide a remote wireless speakerphone which permits the user to have freedom of mobility within the sound range of the loudspeaker on the base unit without being connected by wires so that he can engage in two-way telephone conversations without physical restriction.

It is another object and advantage of this invention to provide a remote wireless speakerphone which permits the user to receiver a call and initiate a two-way conversation without returning to the base speakerphone unit.

It is a further object and advantage of this invention to provide a remote wireless speakerphone which is economic of construction so that it can be widely used and which is reliable so that it has a long life.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIGS. 1-6 are the physical preferred embodiments.

DESCRIPTION OF THE PREFERRED EMBODIMENTS

Figure 5:
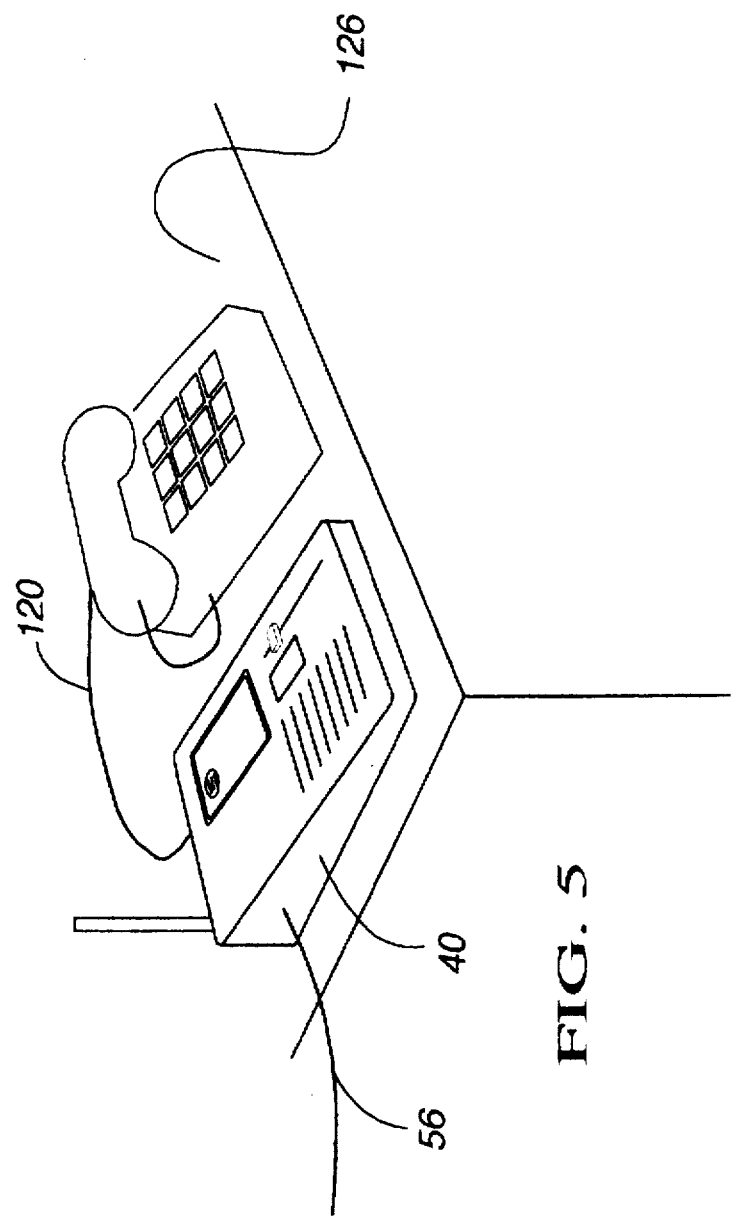
Figure 6:
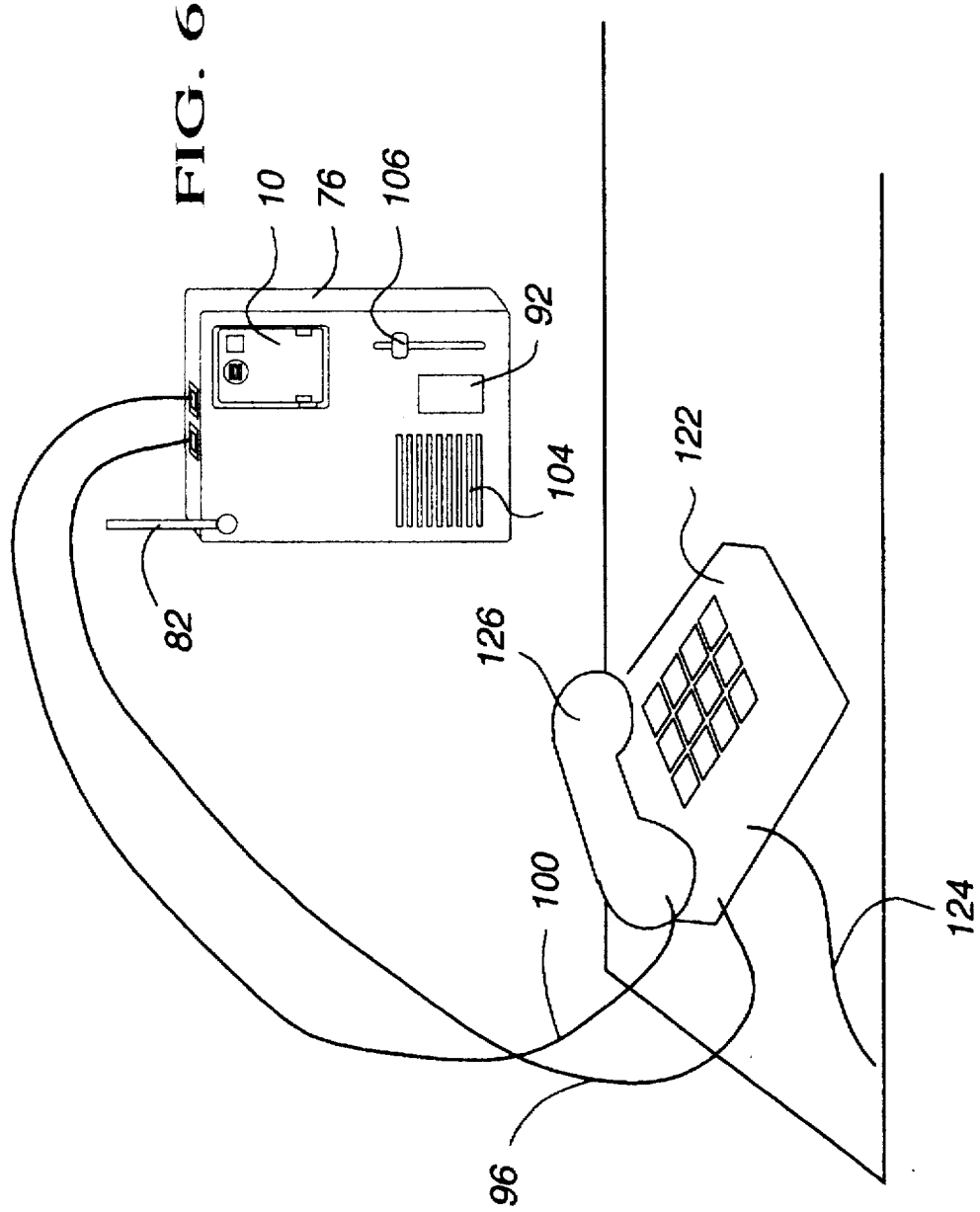
Figure 7:
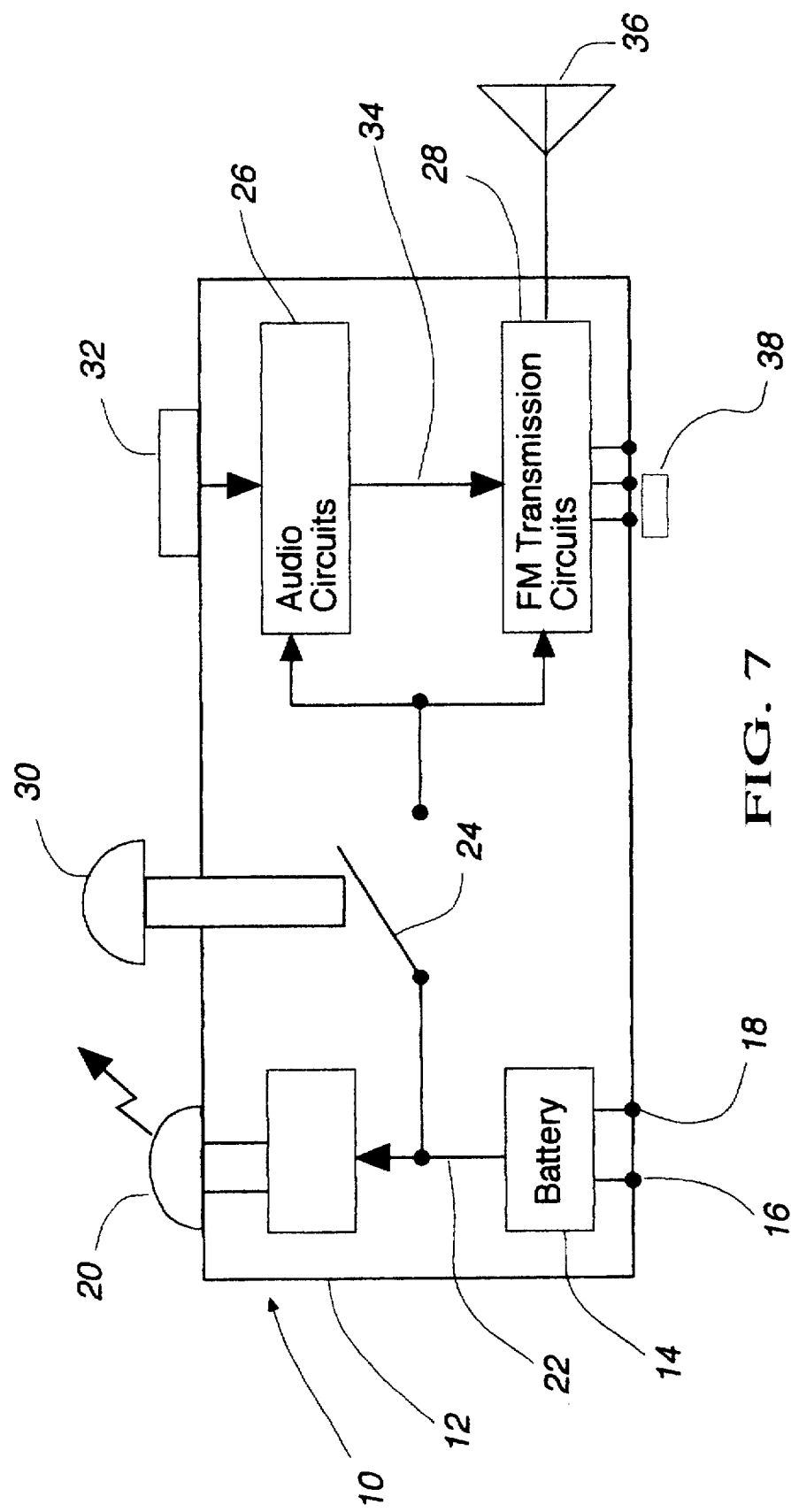
FIG. 7 is an electrical schematic diagram of the transmitter portion which is carried on the user's person of the remote wireless speakerphone of this invention.
Figure 8:
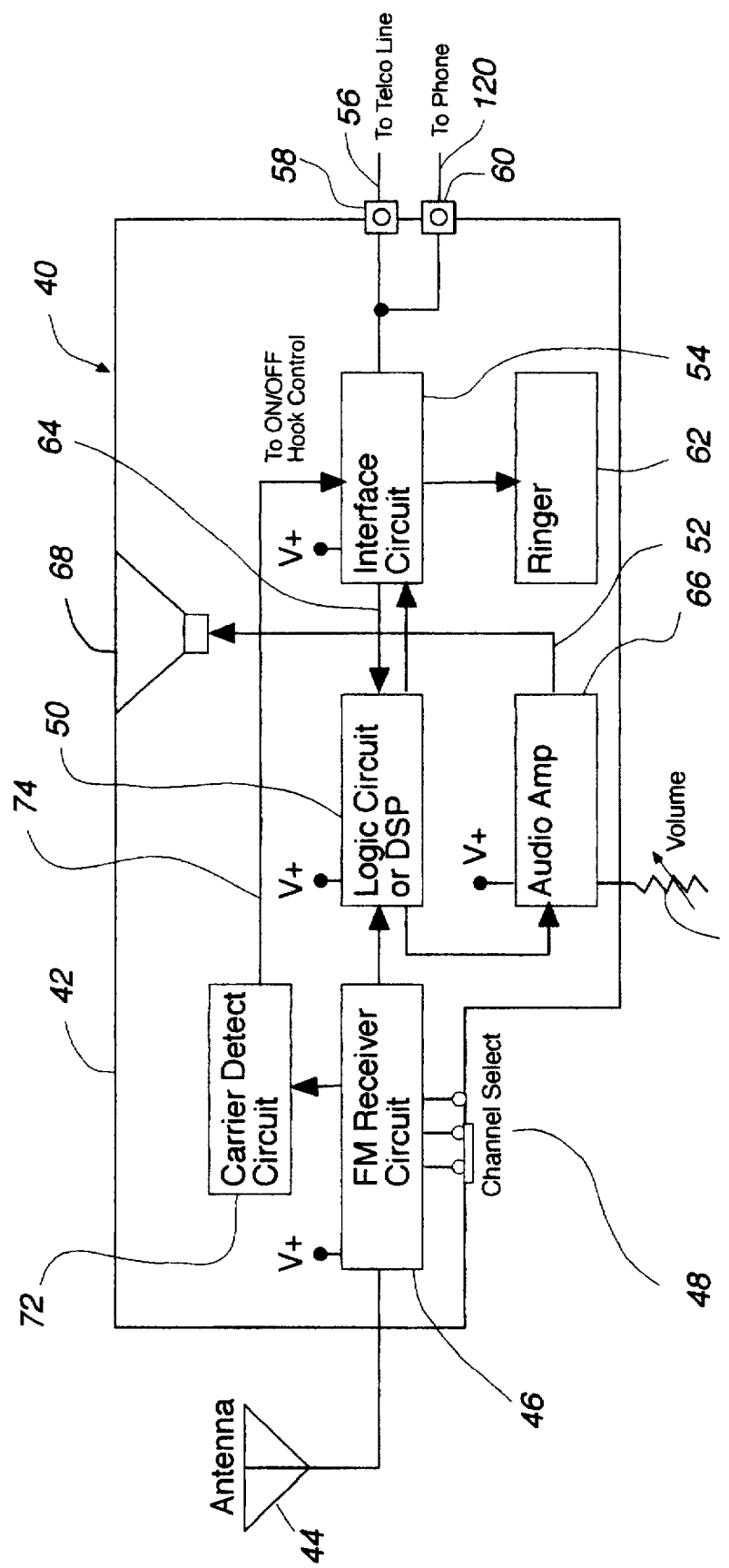
FIG. 8 is an electrical schematic diagram of the first preferred embodiment of the base station portion of the remote wireless speakerphone, where it is directly connected to a telephone company line.
Figure 9:
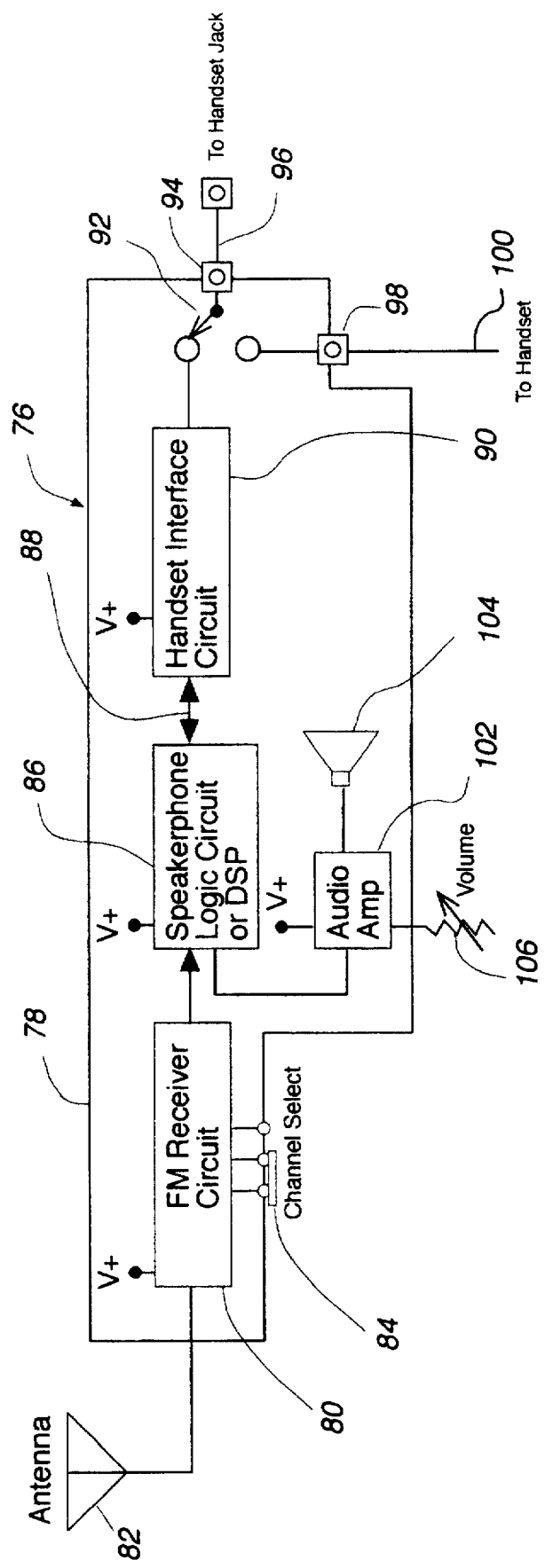
FIG. 9 is an electrical schematic diagram of a second preferred embodiment of the base station of the remote wireless speakerphone of this invention, where it is connected to the handset jack receptacle of a wired-in telephone.

FIG. 1 schematically illustrates the transmitter portion 10 of the remote wireless speakerphone of this invention. The transmitter portion is associated with either one of the base stations shown in FIGS. 2 and 3. The transmitter 10 comprises a housing 12 which is carried with the user, such as by being carried in a shirt pocket or clipped in the shirt, blouse or jacket of the user. The transmitter portion is configured to be of small size, and its contents are such that it can be of small weight so that it can be easily carried. The transmitter is powered by an internal battery 14 which is recharged at contacts 16 and 18, which are exposed externally to the housing. In conventional form, the battery is recharged by placing the transmitter into a recharging station when the transmitter is not expected to be used. The housing carries a low battery indicator 20 which is connected to the battery output line 22. The user is thus aware of the need for recharging.

The battery output line 22 is connected through switch 24 to both the audio circuitry 26 and the FM transmitter circuitry 28. An external switch actuator 30 completes the circuit when actuated. Microphone 32 is connected to the audio circuits, and the audio circuits, in turn, are connected to the FM transmitter circuits through line 34. The FM transmitter transmits signals on an approved band out of antenna 36. Several channels may be available in that band, and a channel selector switch 38 is provided so that a free band can be employed.

The transmitter portion 10 is carried by the user and, when he wants to use the remote wireless speakerphone system, he actuates switch 30 to power the circuitry. He then speaks, and the signal is transmitted to the base station.

FIG. 2 illustrates a base station 40 which is compatible with the transmitter portion 10 of the system and which is connected directly to the telephone line. The base station 40 has a housing 42 which contains the electronics and equipment associated therewith and which is configured to rest on a table or desk adjacent the telephone line connection. The base station 40 has a receiving antenna 44 by which it receives signals from the transmitter portion 10 from its antenna 36. The antenna 44 is connected to FM circuit 46. The receiver circuit has a channel selector switch 48 so that it is sensitive to the same channel as transmitter 28. The audio output of FM receiver 46 is delivered to the base station logic circuit 50. This logic circuit permits audio output through line 52 to the interface circuit 54, which matches the audio circuit to the telephone company line 56. This is a regular plug-in to the conventional telephone company 2-wire circuits. Receptacle 58 is for plug-in of the standard telephone company line. Should a separate standard telephone also be desired on that line, a separate receptacle 60 is connected in parallel to the receptacle 58 for plugging in a conventional telephone.

One of the things the interface circuit 54 accomplishes is to separate out the ringing signal. The ringing signal is delivered to ringer 62. With the ringer signal separated, the audio signal from the telephone line is delivered in line 64 to the logic circuit 50. In the first preferred embodiment, the logic circuit 50 is a circuit which provides half-duplex operation. This means that, when there is an input from the transmitter portion of FIG. 1 to the receiver 46, that becomes the dominant signal path and the incoming radio signal in line 64 is cut off. When there is no audio signal in the FM receiver 46, then the audio signal in line 64 received from the telephone company line is routed through audio amplifier 66 to loudspeaker 68. This means, when the user is speaking, the incoming audio signal is cut off; but, when the user of the transmitter 10 is not speaking, the logic circuit 50 permits the audio signal 64 to pass through to the speaker preventing feedback. The audio amplifier 66 has a manual volume control 70 so that the audio volume of the loudspeaker 68 can be controlled to suit the room conditions.

Carrier detector circuit 72 is connected to FM receiver 46 and detects when the FM receiver is receiving a signal. The signal represents the state that the transmitter 10 is turned on. The carrier detector circuit 72 is connected through line 74 to interface circuit 54. When a carrier is detected by circuit 72, it signals the interface circuit 54 to provide the off-hook signal to line 56. With the transmitter 10 turned off, an incoming call comes in line 56 preceded by a ringing signal. The circuit 54 transfers the ringing signal to ringer 62. The user is carrying the transmitter 10 somewhere in the same room and hears the ringer signal. The user moves actuator 30 and closes switch 24. This turns on transmitter 28, and the receiver 46 receives the signal. A carrier is detected by circuit 72, and this changes the state of the interface circuit 54 to off-hook. The user acknowledges the incoming telephone call by speaking into microphone 32. This transfers a signal through the transmitter-receiver system. The logic circuit 50 passes the audio response through the interface 54 to the line 56.

When the user stops speaking, in half-duplex operation, the responsive audio signal from line 56 passes through the logic 50 and audio amplifier 66 to speaker 68. Thus, communication is achieved. The half-duplex logic in circuit 54 is convenient and gives the priority to the strongest signal. If full duplex operation is desired, the priority switching circuit may be a digital signal processor configured to recognize and eliminate feedback while permitting both parties to talk at the same time.

It is also possible to configure the transmitter 10 with dialing capabilities. In this case, the user closes switch 24 which causes the carrier detector circuit 72 to cause the interface circuit 54 to go to the off-hook condition where the line is seized. The dial tone is heard on the speaker 68. Thereupon, the user actuates the dialer on the transmitter 10 so that the dialing signal goes out on the telephone company line and the circuit is completed for a two-way conversation. When the call is complete, the user turns off the transmitter. The carrier detecting circuit 72 senses the loss of the carrier and signals the interface circuit to release the line. The call is thereby terminated. Thus, the base station 40 is useful for direct connection to a single telephone company line.

In business environments, there is a wide variety of different phone systems. In business systems, the usual telephone is a multi-line telephone set which has a number of different functions including line selection, line hold, multi-line conferences, and intercommunication between selected telephones as well as other functions of the telephone system. In order to maintain these many functions provided by the telephone set and its multi-line connections, the base station of this remote wireless speakerphone is plugged into the handset receptacle of the multi-line business telephone. All dialing and switching operations are performed at the business telephone.

The preferred embodiment of the base station of the remote wireless speakerphone in accordance with this invention is generally indicated at 76 in FIG. 3. The base station 76 has a housing 78 which is configured to rest on a desk or a table adjacent a business-type multi-line telephone. Within the housing is an FM receiver 80 which has its antenna 82 which receives the signals from the transmitter portion 10, which is also common to this embodiment. The receiver 80 has a channel selector switch 84 which can be switched to be compatible with the FM transmitter 28. The output of the FM receiver circuit 80 goes to the speakerphone logic circuit 86. This is preferably a half-duplex switching circuit which is configured so that, when the signal from the receiver circuit 80 is dominant, it passes that signal through line 88 to the handset interface circuit 90. The handset interface circuit is connected through selector switch 92 to receptacle 94, which is a standard handset cord receptacle. Handset cord 96 plugs into the handset receptacle on the business-style telephone.

In order to open a line, the handset is removed from its cradle on the handset. To permit the handset to be used in the normal manner, selector switch 92 has a position wherein receptacle 94 is connected to receptacle 98, which receives a cord 100 which is connected to a regular handset. When the selector switch 92 is in its lower position, the telephone and handset can be used in its usual way. However, when the selector switch is in the upper position shown in FIG. 3, the handset interface circuit 90 is connected through the business telephone to the telephone lines. When an audio signal comes through the telephone lines, the logic circuit 86 supplies it to the audio amplifier 102 which drives loudspeaker 104. The audio amplifier may have a volume control 106 or may be arranged for automatic volume control. In this way, two-way conversation can be achieved on a half-duplex basis. If desired, the logic circuit 86 can be a signal processing circuit configured to recognize and eliminate feedback. With such a circuit, both parties can talk at the same time. At the present time, signal processor circuits of that nature are digital in nature.

In use, the receiver 80 operates on the selected one of the several cordless telephone channels and is set to match the accompanying transmitter 28. The audio output of the receiver is fed to the logic circuit 86, which contains a priority switching circuit to prevent the microphone and speaker from being on at the same time, which would cause feedback. When the receiver signal is dominant, the logic circuit routes the signal through the handset interface circuit 90, but adapts the audio signal to the proper levels and impedances to match the handset jack of the telephone unit. The base station 76 plugs into the handset jack of the telephone, as described. In practice, the user switches the selector switch to the speakerphone position, accesses the telephone line by removing the handset from the telephone cradle, and dials or answers a call. The user is then free to move about his office at will as long as he is in within hearing distance of the loudspeaker 104. With this equipment, he can maintain a conversation with his party. When he is finished with the call, the user returns to the office telephone and replaces the handset in the cradle hanging up as with conventional handset use.

This invention has been described in its presently contemplated best modes, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A remote wireless speakerphone comprising:

a portable unit consisting essentially of a microphone to receive and audio signal, a radio signal transmitter, an antenna to transmit a corresponding radio signal and a battery to power said transmitter so that said transmitter can be carried on the person and transmit audio signals:

a base station, said base station having an antenna to receive signals from said transmitter and having a radio signal receiver therein to convert radio signals to audio signals, an interface circuit in said base station, said interface circuit being connected to receive audio signals from said receiver, means for direct connection to a telephone company line on said base station, said interface circuit being connected to said means for connection;

a ringer in said base station, said ringer being connected to said interface circuit so that when said line connection means has a ringer signal therein, said ringer emits a ringing signal, a loudspeaker in said base station, said loudspeaker being connected to emit audio signals corresponding to signals received at said telephone company line connection means, a logic circuit in said base station, said logic circuit being configured so that it passes a signal therethrough in only one direction at a time, said logic circuit being connected between said receiver and said interface circuit, said loudspeaker being connected to said logic circuit so that either said receiver is connected through said logic circuit and said interface circuit to said telephone line connection means or said telephone line connection means is connected through said interface circuit and said logic circuit to said loudspeaker to avoid feedback from said loudspeaker to said microphone.

2. The remote wireless speakerphone of claim 1 wherein said base station has in parallel to its means for connection to a telephone line a telephone jack for connection to a telephone so that a telephone can be employed in parallel to said transmitter.

3. A remote wireless speakerphone comprising:

a portable transmitter housing sized to fit into a shirt pocket, said portable transmitter housing having therein a radio transmitter and a battery, a manually actuatable switch between said battery and said radio transmitter to energize said radio transmitter when said manually actuatable switch is actuated, a microphone carried by said portable housing and an antenna carried on said portable housing, said microphone being connected to said radio transmitter to supply voice signals thereto and said antenna being connected to said radio transmitter to transmit corresponding radio signals;

a base station, said base station having a base station housing, said base station having a radio receiver circuit and having a radio receiving antenna connected to said receiver so that signals emitted from said portable transmitter are received by said receiver;

a receptacle on said base station housing, said receptacle being connectable by wire to a telephone device configured for transmitting audio information by wire, an interface circuit connected to said receptacle;

a logic circuit connected to both said receiver circuit and said interface circuit, a loudspeaker connected to said logic circuit, said logic circuit being configured to pass the stronger of the two signals received from said receiver circuit and from said interface circuit and being configured to pass a receiver signal to said interface circuit when it is stronger and configured to pass an audio signal to said loudspeaker when stronger so that a two-way conversation can be carried on from said microphone to said receptacle and back to said loudspeaker.

4. The remote wireless speakerphone of claim 3 wherein said receptacle on said base station housing is a handset receptacle for wired connection to the handset receptacle on a telephone, there is a second handset receptacle on said base housing for connection to the handset of a telephone and there is a selector switch for selecting connection of said first receptacle to said interface circuit or to said second handset receptacle.

5. The remote wireless speakerphone of claim 3 wherein there is a ringer within said base housing, said ringer being connected to said interface circuit to ring when a ringing signal is received by said receptacle.

6. The remote wireless speakerphone of claim 3 wherein there is a carrier detection circuit in said base housing, said carrier detection circuit being connected to said receiver and to said interface circuit and being configured so that when said radio transmitter in said portable housing is transmitting, said interface circuit opens the signal in said receptacle to said logic circuit.

7. The remote wireless speakerphone of claim 6 wherein there is a ringer in said base housing, said ringer being connected to said interface circuit to ring when a ringing signal is received by said receptacle.

8. A remote wireless speakerphone system comprising:

a portable unit consisting essentially of a microphone to receive an audio signal, a radio signal transmitter, an antenna to transmit a corresponding radio signal and a battery to power said transmitter so that said transmitter can be carried on the person and transmit audio signals as radio signals;

a base station, said base station having an antenna to receive signals from said transmitter and having a radio signal receiver therein to convert radio signals to audio signals, an interface circuit in said base station, said interface circuit being connected to receive audio signals from said receiver, means for direct connection to a telephone company line on said base station, said interface circuit being connected to said means for connection, wherein a carrier detection circuit is connected to said receiver and to said interface circuit so that, when said receiver receives a signal from said transmitter, said interface circuit connects to said connection means to open a telephone company line connected thereto;

a rinser in said base station, said ringer being connected to said interface circuit so that, when said line connection means has a ringer signal therein, said ringer emits a ringing signal, and a loudspeaker in said base station, said loudspeaker being connected to emit audio signals corresponding to signals received at said telephone company line connection means so that signals received from said telephone company line connection means become audible and audible signals delivered to said microphone are delivered to said connection means;

a logic circuit in said base station, said logic circuit being configured so that it passes a signal therethrough in only one direction at a time, said logic circuit being connected between said receiver and said interface circuit, said loudspeaker being connected to said logic circuit so that either said receiver is connected through said logic circuit and said interface circuit to said telephone line connection means or said telephone line connection means is connected through said interface circuit and said logic circuit to said loudspeaker to avoid feedback from said loudspeaker to said microphone.

* * * * *